Patented Aug. 19, 1952

2,607,757

UNITED STATES PATENT OFFICE 2,607,757

PHENOL-THIAZYL THIO METHYL UREA REACTION PRODUCTS

Marion W. Harman, Nitro, W. Va., assignor to Monsanto Chemical Company, St. Louis, Mo., a corporation of Delaware No Drawing. Application June 10, 1950, Serial No. 167,477

14 Claims. (Cl. 260—47)

This invention relates to new and novel compositions of matter. More particularly it relates to reaction products of hydroxy aromatic hydrocarbons with N-(2-thiazyl thio methyl) ureas and to their method of manufacture.

It has been found in accordance with this invention that the reaction products of hydroxy aromatic hydrocarbons with N-(2-thiazyl thio methyl) ureas of the general formula

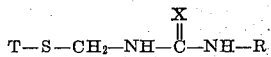

$$T-S-CH_2-NH-\overset{\overset{X}{\|}}{C}-NH-R$$

where T is a thiazyl radical, where X is a member of group VI of the periodic table of atomic weight less than 33, and where R is hydrogen, an alkyl, aryl, aralkyl, methylol (—CH₂OH) or methyl thio thiazyl (—CH₂—S—T) radical comprise a new and novel family of useful compounds.

As exemplary of the preparation of the new compounds the following are illustrative but are not to be construed as limitative thereof.

Example 1

To a 3-neck flask equipped with a stirrer, a thermometer, and an air cooled reflux condenser were charged 209 parts by weight (substantially 0.5 mol) of bis N,N'-(2-benzothiazyl thio methyl) urea and 188 parts by weight (substantially 2.0 mols) of phenol. The reaction mix was then heated in an oil bath for 80 minutes at a temperature of about 175–180° C. Vacuum was applied to the reaction mix and 102 parts by weight (substantially 1.1 mols) of phenol was recovered. The product, 284 parts by weight of a brown sticky resinous material, was soluble in dilute caustic, benzene, acetone, and in alcohol. This resinous product was believed to consist principally of a product containing approximately 1.7 mols of phenol per mol of bis N,N'-(2-benzothiazyl thio methyl) urea.

Example 2

To a suitable reaction vessel equipped with an air condenser, a thermometer, and a stirrer were charged 104.5 parts by weight (substantially 0.25 mol) of bis N,N'-(2-benzothiazyl thio methyl) urea and 110 parts by weight (substantially 1.0 mol) of resorcinol. The reaction mix was then heated in an oil bath for 3 hours at 175–180° C. A black resinous material was obtained which was extracted with caustic, washed with water, and filtered. Upon acidification of the filtrate with dilute sulfuric acid a brick red gummy substance developed which gradually turned into a brittle resin. After removal of the residual acid 139.3 parts by weight of a brick-red resin having a melting point range of 155–165° C. was obtained. The resin believed to consist chiefly of a product containing approximately 1.7 mols of resorcinal per mol of bis N,N'-(2-benzothiazyl thio methyl) urea was found to be soluble in dilute caustic, acetone, and alcohol.

In a similar fashion hydroquinone was reacted with bis N,N'-(2-benzothiazyl thio methyl) urea. A brittle black resinous material was obtained which was soluble in caustic soda, acetone, and ethyl acetate.

Other hydroxy aromatic hydrocarbons than the above which when reacted with an N-(2-thiazyl thio methyl) urea produce useful compositions are catechol, the naphthols, p-tert. butyl phenol, thymol, carvacrol, the cresols, the xylenols, guaiacol, pyrogallol, and the like.

Among the N-(2-thiazyl thio methyl) ureas other than bis N,N'-(2-benzothiazyl thio methyl) urea which are satisfactory are the N-(2-thiazolinyl thio methyl) ureas and thioureas, the N-(4,5-dimethyl, 2-thiazyl thio methyl) ureas and thioureas, the N-(4-ethyl, 2-thiazyl thio methyl) ureas and thioureas, the N-(4,5-diethyl, 2-thiazyl thio methyl) ureas and thioureas, the N-(4,5-dibutyl, 2-thiazyl thio methyl) ureas and thioureas, the N-(4-octyl, 2-thiazyl thio methyl) ureas and thioureas, and the reaction products of mercapto arylene thiazoles with methylol carbamides and methylol thiocarbamides as described and disclosed by Robert L. Sibley in U. S. Patent 2,145,808. The N,N'-(2-arylene thiazyl thio methyl) ureas are preferred in the manufacture of the new products.

The new chemicals are useful in the making of semi-rigid products as for example leather substitutes for soling. A composition of matter useful for soling purposes was prepared by first cold mixing 60 parts by weight GR-S (butadiene-styrene rubber-like copolymer) and 40 parts by weight of the resinous product of Example 1 on an ordinary rubber compounding mill. The latter was very soluble in the former and the resultant product exhibited almost no tack. Thereupon 25 parts by weight magnesium oxide, 5 parts by weight wood flour, 3 parts by weight sulfur, and 2 parts by weight monoethanolamine were mill mixed into the aforementioned resin-rubber composite. Thereupon the stock was vulcanized in the usual manner by heating in a press at 142° C. for 60 minutes. The vulcanizate so obtained exhibited good tear resistance and hardness properties and possessed a 500% modulus of 810 p. s. i., a tensile strength of 1250 p. s. i., and an ultimate elongation of 600%.

The new chemicals are described and claimed as rubber antioxidant activators in co-pending application Serial No. 71,399, filed January 17, 1949, now Patent 2,582,695, issued January 15, 1952.

What is claimed is:

1. As a new composition of matter the resin consisting essentially in the product of the reaction of a monohydric aromatic hydrocarbon and a compound of the general formula

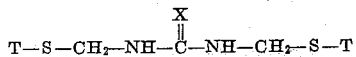

where T is an arylene thiazyl radical and where X is an element of atomic weight less than 33 and a member of group VI of the periodic table containing approximately 1.7 moles of monohydric aromatic hydrocarbon per mole of the other reactant.

2. As a new composition of matter the resin consisting essentially in the product of the reaction of a dihydric aromatic hydrocarbon and a compound of the general formula

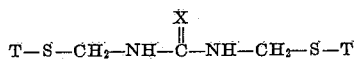

where T is an arylene thiazyl radical and where X is an element of atomic weight less than 33 and a member of group VI of the periodic table containing approximately 1.7 moles of dihydric aromatic hydrocarbon per mole of the other reactant.

3. As a new composition of matter the resin consisting essentially in the product of the reaction of a dihydroxy benzene and a bis N,N'-(2-arylene thiazyl thio methyl) urea containing approximately 1.7 moles of dihydroxy benzene per mole of the other reactant.

4. As a new composition of matter the resin consisting essentially in the product of the reaction of hydroquinone and bis N,N'-(2-benzothiazyl thio methyl) urea containing approximately 1.7 moles of hydroquinone per mole of bis N,N'-(2-benzothiazyl thio methyl) urea.

5. As a new composition of matter the resin consisting essentially in the product of the reaction of resorcinol and bis N,N'-(2-benzothiazyl thio methyl) urea containing approximately 1.7 moles of resorcinol per mole of bis N,N'-(2-benzothiazyl thio methyl) urea.

6. As a new composition of matter the resin consisting essentially in the product of the reaction of phenol and bis N,N'-(2-benzothiazyl thio methyl) urea containing approximately 1.7 moles of phenol per mole of bis N,N'-(2-benzothiazyl thio methyl) urea.

7. The method of making the composition of claim 1 which comprises heating about four moles of a monohydric aromatic hydrocarbon and one mole of a compound of the general formula

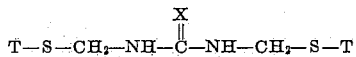

where T is an arylene thiazyl radical and where X is an element of atomic weight less than 33 and a member of group VI of the periodic table and removing unreacted constituents.

8. The method of making the composition of claim 2 which comprises heating about four moles of a dihydric aromatic hydrocarbon and one mole of a compound of the general formula

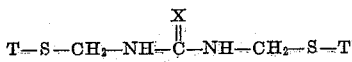

where T is an arylene thiazyl radical and where X is an element of atomic weight less than 33 and a member of group VI of the periodic table and removing unreacted constituents.

9. The method of making the composition of claim 3 which comprises heating about four moles of a dihydroxy benzene and one mole of a bis N,N'-(2-arylene thiazyl thio methyl) urea and removing unreacted constituents.

10. The method of making the composition of claim 4 which comprises heating about four moles of hydroquinone and one mole of bis N,N'-(2-benzothiazyl thio methyl) urea and removing unreacted constituents.

11. The method of making the composition of claim 5 which comprises heating about four moles of resorcinol and one mole of bis N,N'-(2-benzothiazyl thio methyl) urea and removing unreacted constituents.

12. The method of making the composition of claim 6 which comprises heating about four moles of phenol and one mole of bis N,N'-(2-benzothiazyl thio methyl) urea and removing unreacted constituents.

13. As a new composition of matter the resin consisting essentially in the product of the reaction of a hydroxy substituted aromatic hydrocarbon and a compound of the general formula

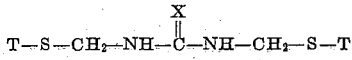

where T is an arylene thiazyl radical and X is a member of group VI of the periodic table having an atomic weight less than 33 containing approximately 1.7 moles of hydroxy aromatic hydrocarbon per mole of the other reactant.

14. The method of making the composition of claim 13 which comprises heating about four moles of an hydroxy substituted aromatic hydrocarbon and one mole of a compound of the general formula

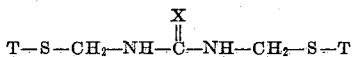

where T is an arylene thiazyl radical and X is a member of group VI of the periodic table having an atomic weight less than 33 and removing unreacted constituents.

MARION W. HARMAN.

REFERENCES CITED

The following references are of record in the file of this patent:

UNITED STATES PATENTS

| Number | Name | Date |
|---|---|---|
| 2,145,808 | Sibley | Jan. 31, 1939 |
| 2,150,463 | Sebrell | Mar. 14, 1939 |